UNITED STATES PATENT OFFICE.

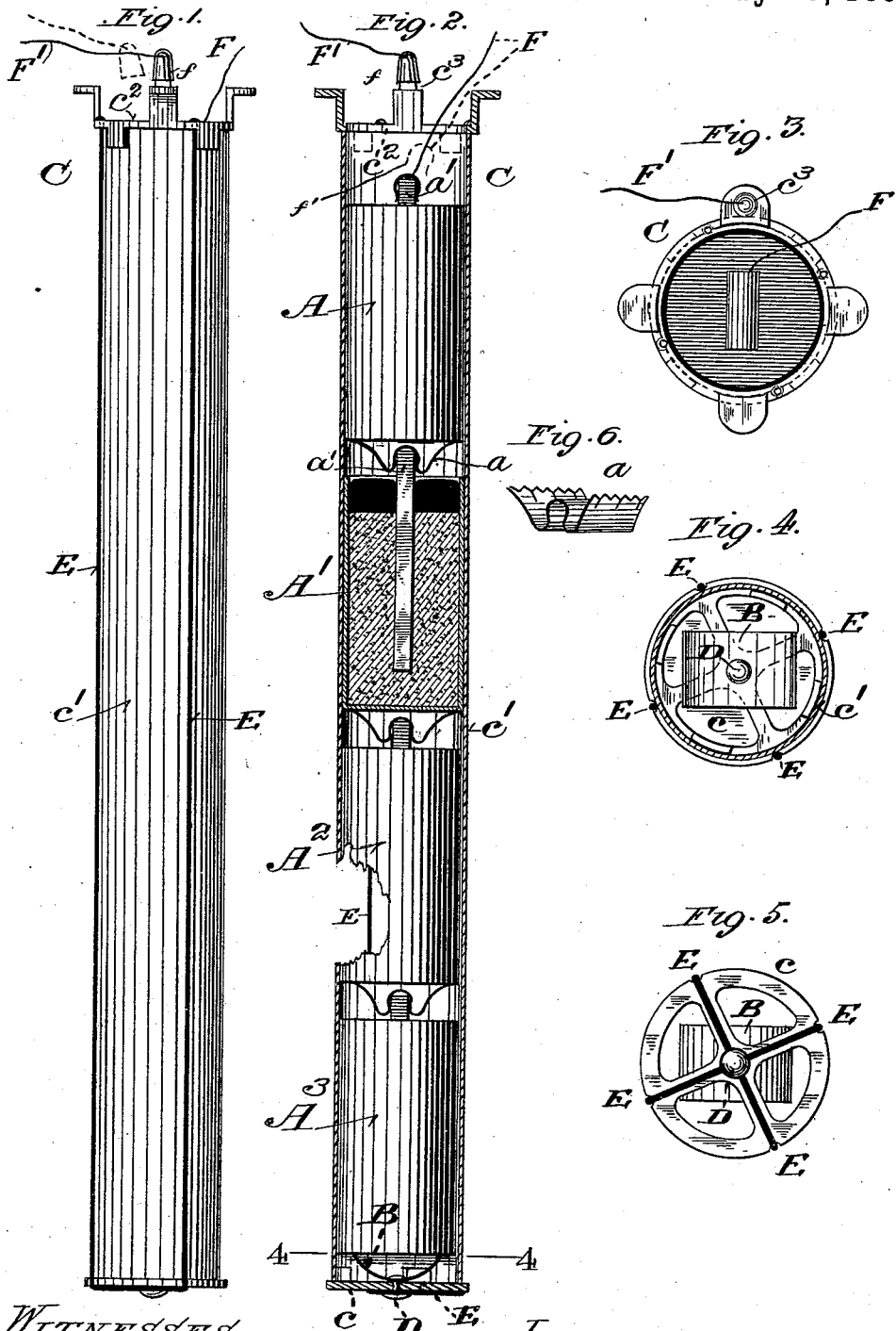

SAMUEL H. HOGGSON, OF ST. LOUIS, MISSOURI, ASSIGNOR OF ONE-HALF TO WILLIAM H. STEVENSON, OF SAME PLACE.

ELECTRIC BATTERY.

SPECIFICATION forming part of Letters Patent No. 520,429, dated May 29, 1894.

Application filed March 6, 1893. Serial No. 464,885. (No model.)

*To all whom it may concern:*

Be it known that I, SAMUEL H. HOGGSON, of St. Louis, Missouri, have made a new and useful Improvement in Electric Batteries, of which the following is a full, clear, and exact description.

My object more especially is to provide a light, portable and cheap receptacle for holding a battery having a number of cells, and that can be easily and cheaply made, readily handled and transported, and capable of use in connection with various constructions, and under various conditions, and also suited for being conveniently inclosed or held in some article, or part of some article, of furniture, for instance, in the leg or support of a table top, or other analogous upright, and thus sustained in position without requiring a special support therefor.

An additional feature consists of the improved means for providing electrical connection between the battery cells without the use of bolts, screws, or wires, and so that the cells may be removed and fresh ones substituted, and all in an expeditious manner, and without interfering with the performance of the work the battery is required to do, all substantially as is hereinafter set forth and claimed, aided by the annexed drawings, making part of this specification, in which—

Figure 1 is a side elevation of the improved battery; Fig. 2 a sectional elevation of the same, the cells being shown in side elevation, and the battery holder in section; Fig. 3 a plan of the battery and battery-holder; Fig. 4 a horizontal section on the line 4—4 of Fig. 2; Fig. 5 a bottom view of the battery holder; Fig. 6 a view in perspective of one of the clamps or connecting devices used in jointing cells.

The same letters of reference denote the same parts.

A, A', A², A³, represent the cells of the battery. They may be of any of the well known forms, but for my present purpose I use a cell, either wet or dry, having a metallic or carbon jar, thus enabling the positive pole of one cell to be connected with the negative pole of the next cell by means of a metallic clamp, $a$, and without employing any other means than its weight to hold one cell in place upon another. Any desired number of cells may be thus associated. The upper cell rests upon the clamp, $a$, which is in the form of a saddle-shaped part of springy material, and which in turn rests upon the terminal, $a'$, of the cell beneath. The lowermost cell rests upon and is in contact with a spring plate, B, which in turn is secured to the metallic spider, $c$, which constitutes the bottom of the battery holder C. The rivet or bolt D, serves to unite, and also to electrically connect the clamp B, plate or spider $c$, and one or more conductor wires E. The battery holder, C, consists of a tube, $c'$, of insulating material, such as glass, wood, rubber, or paper, the spider $c$, and the top ring $c^2$. The wires E extend from the bolt D to the periphery of the spider $c$, and thence upon the opposite side of the tube $c$ to the ring, $c^2$, and serving both to unite the parts of the holder and also as conductors to carry the electric current from the spider $c$, to the ring $c^2$. The top ring, $c^2$, is provided with a terminal, $c^3$, which, with the terminal, $a'$, of the top cell, are the points with which the wires F, F', which serve to conduct the current or connect it. The wire, F', is provided with a thimble-shaped part, $f$, which, to connect that wire, can be readily slipped onto the terminal $c^3$, and the wire F, is provided with a spring-clamp, $f'$, which can be readily sprung onto the terminal $a'$. The described spring clamp connections, $a$, $f'$, are desirable in that they are not liable to get loose or form a poor connection, as when expanded or contracted, or as when vibrated as on a railway train or steam ship, and which is liable to be the case when nuts, bolts, or screws are employed for the purpose in question.

I claim—

1. The herein described electric battery the same consisting of the vertical series of cells, the containing-tube of non-conductor material, the plates at the ends respectively of said tube, and the wires on the opposite sides of said tube electrically connected to the upper case-plate, said cells being electrically connected with each other in series, the lowermost cell being electrically connected with said wires, and the uppermost cell and the upper case-plate being respectively provided with terminals, substantially as described.

2. The combination of the cells arranged in a vertical series and electrically-connected as described, the case C having the tubular part $c'$ and the end plates $c$ and $c^2$, the spring plate B, secured to plate $c$ by the bolt, D, and the wires E, E, on the opposite side of the tube substantially as described.

3. A battery tube of non conductor material, the plates at the end of said tube, the upper of conducting material, and the wires uniting said tube and plates, said wire made of conductor material and electrically connected to the upper plate and provided with means for engaging the terminal of the lowermost cell.

4. In an electric battery having cells arranged in series and connected by adjacent terminals the combination of the spring-clamp $a$ the cell above or beyond said clamp, and the terminal $a'$, of the adjoining cell, substantially as described.

Witness my hand this 14th day of December, 1892.

SAMUEL H. HOGGSON.

Witnesses:
C. D. MOODY,
A. BONVILLE.